(12) United States Patent
Rector et al.

(10) Patent No.: US 9,096,444 B2
(45) Date of Patent: Aug. 4, 2015

(54) LOW PRESSURE DROP REMEDIATION BED FOR WATER BASED COOLANT LOOPS

(75) Inventors: Tony Rector, East Granby, CT (US); John W. Steele, New Hartford, CT (US)

(73) Assignee: HAMILTON SUNDSTRAND SPACE SYSTEMS INTERNATIONAL, INC., Windsor Locks, CT (US)

(*) Notice: Subject to any disclaimer, the term of this patent is extended or adjusted under 35 U.S.C. 154(b) by 420 days.

(21) Appl. No.: 13/474,094

(22) Filed: May 17, 2012

(65) Prior Publication Data
US 2013/0306574 A1 Nov. 21, 2013

(51) Int. Cl.
| | |
|---|---|
| *C02F 9/00* | (2006.01) |
| *B01J 47/00* | (2006.01) |
| *C02F 1/28* | (2006.01) |
| *C02F 1/42* | (2006.01) |
| *C02F 1/76* | (2006.01) |
| *C02F 103/02* | (2006.01) |
| *C02F 103/04* | (2006.01) |

(52) U.S. Cl.
CPC .. *C02F 9/00* (2013.01); *B01J 47/00* (2013.01); *C02F 1/283* (2013.01); *C02F 1/42* (2013.01); *C02F 1/766* (2013.01); *C02F 2001/427* (2013.01); *C02F 2103/023* (2013.01); *C02F 2103/04* (2013.01); *C02F 2201/006* (2013.01); *C02F 2201/007* (2013.01); *C02F 2303/04* (2013.01)

(58) Field of Classification Search
CPC ............ C02F 21/28; C02F 1/30; C02F 1/307; C02F 3/1268; C02F 3/2853; C02F 9/00; C02F 2001/007; C02F 2003/001; C02F 2303/16; C02F 1/283

USPC .......... 210/264, 266, 282, 283, 284, 287, 289
See application file for complete search history.

(56) References Cited

U.S. PATENT DOCUMENTS

| | | | | |
|---|---|---|---|---|
| 4,238,477 A | * | 12/1980 | Lambert et al. | ................. 521/31 |
| 4,853,130 A | * | 8/1989 | D'Angelo et al. | ............ 210/663 |
| 4,999,190 A | * | 3/1991 | Fina et al. | .................. 424/78.12 |
| 5,468,397 A | * | 11/1995 | Barboza et al. | ............... 210/798 |
| 5,518,626 A | | 5/1996 | Birbara et al. | |
| 5,529,683 A | | 6/1996 | Critz et al. | |
| 5,556,279 A | * | 9/1996 | Wolf et al. | ...................... 433/82 |
| 5,562,824 A | | 10/1996 | Magnusson | |
| 5,635,063 A | | 6/1997 | Rajan et al. | |
| 5,667,696 A | * | 9/1997 | Studer et al. | .................. 210/702 |
| 5,997,750 A | * | 12/1999 | Rozelle et al. | ................ 210/744 |
| 6,096,216 A | * | 8/2000 | Shanbrom et al. | ............ 210/638 |
| 6,120,686 A | * | 9/2000 | Bilz | .............................. 210/266 |

(Continued)

FOREIGN PATENT DOCUMENTS

| | | |
|---|---|---|
| EP | 1 961 483 A1 | 8/2008 |
| WO | 2012 031067 | 3/2012 |

OTHER PUBLICATIONS

European Search Report for EP Application No. 13167855.9, Jul. 17, 2013.

*Primary Examiner* — Chester Barry
(74) *Attorney, Agent, or Firm* — Carlson, Gaskey & Olds, P.C.

(57) ABSTRACT

A water-based remediation bed includes a container providing a fluid cavity. Organic, inorganic and biological remediation media are arranged in the cavity and are configured to permit a water-based fluid within the cavity to simultaneously flow through the media.

10 Claims, 4 Drawing Sheets

(56) References Cited

U.S. PATENT DOCUMENTS

| | | | |
|---|---|---|---|
| 6,197,193 B1 * | 3/2001 | Archer | 210/266 |
| 6,315,815 B1 | 11/2001 | Spadaccini et al. | |
| 6,326,326 B1 | 12/2001 | Feng et al. | |
| 6,468,953 B1 | 10/2002 | Hitchems et al. | |
| 7,857,979 B2 * | 12/2010 | Rector et al. | 210/685 |
| 8,021,610 B2 | 9/2011 | Code | |
| 8,382,981 B2 * | 2/2013 | Rogers et al. | 210/323.1 |
| 2006/0000495 A1 | 1/2006 | Brown | |
| 2006/0249465 A1 * | 11/2006 | Jin et al. | 210/764 |
| 2007/0246419 A1 | 10/2007 | Milosavljevic | |
| 2010/0193422 A1 | 8/2010 | Sawaya et al. | |
| 2011/0217544 A1 | 9/2011 | Young et al. | |

* cited by examiner

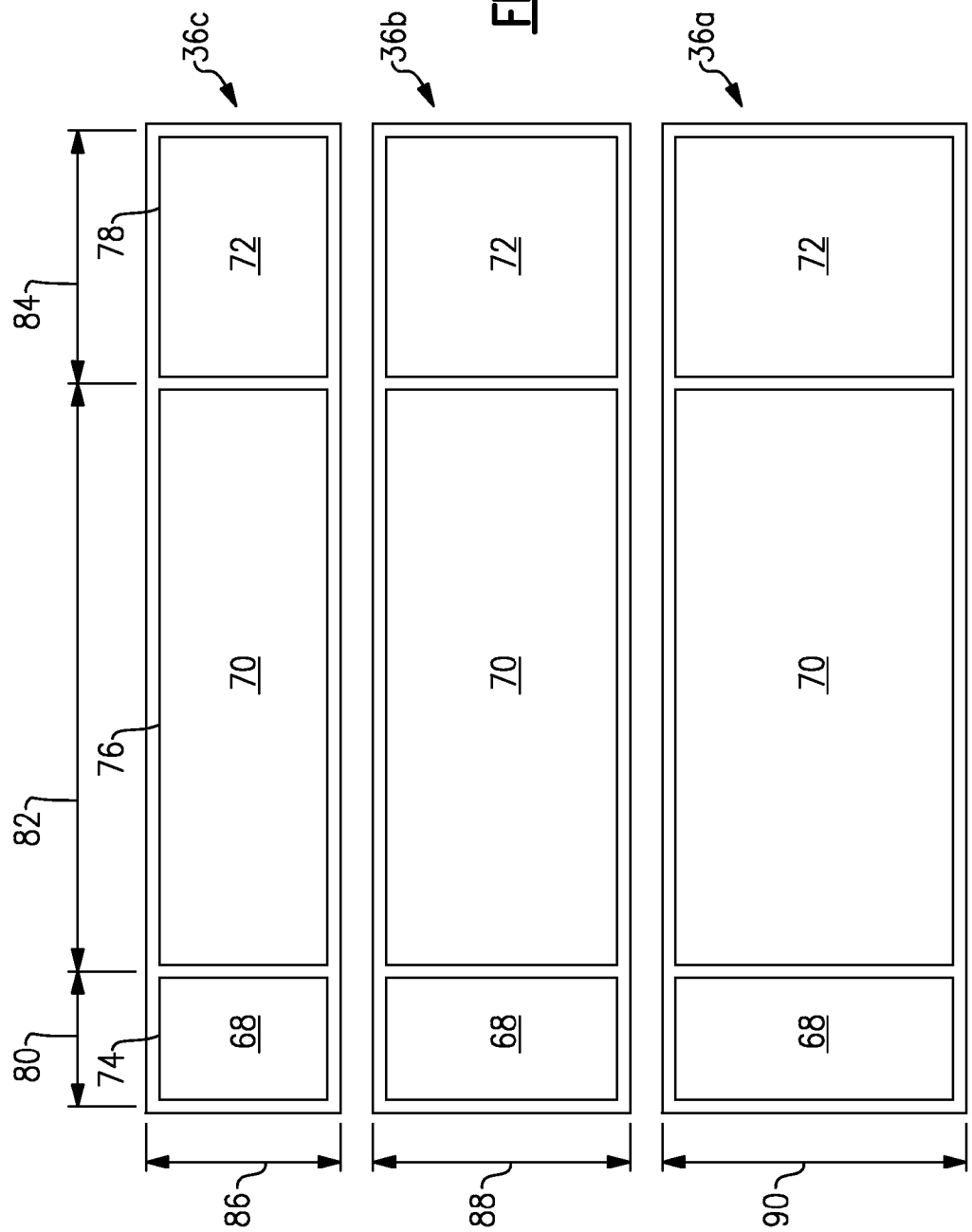

LOW PRESSURE DROP REMEDIATION BED FOR WATER BASED COOLANT LOOPS

BACKGROUND

This disclosure relates to a remediation bed for water-based fluid applications, such as cooling loops. More particularly, the disclosure relates to water-based fluid remediation that includes removing organic, inorganic, and microbial contaminants.

In applications where highly purified water is desired, chemical beds are used to remove organic and inorganic contamination. If the presence of microbes is of concern, an iodination bed may also be used. Typically, these beds are arranged separately from and serially relative to one another such that the water passes through one bed before being provided to the next bed. That is, each bed is provided in separate, discrete cavities from one another that are connected by fluid lines. During remediation, the inorganic and organic contaminants are removed prior to iodination of the water. This is necessary because the iodination products have a propensity to be removed by the organic and inorganic removal beds, resulting in an insufficient amount of iodine needed to act as a biocide.

SUMMARY

In one exemplary embodiment, a water-based remediation bed includes a container providing a fluid cavity. Organic, inorganic and biological remediation media are arranged in the cavity and are configured to permit a water-based fluid within the cavity to simultaneously flow through the media.

BRIEF DESCRIPTION OF THE DRAWINGS

The disclosure can be further understood by reference to the following detailed description when considered in connection with the accompanying drawings wherein:

FIG. 5 schematically depicts several cartridges for the remediation reactor shown in FIG. 3.

DETAILED DESCRIPTION

Figure 1:
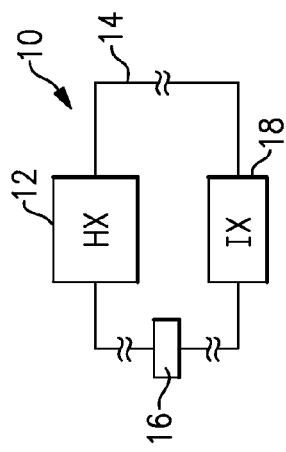
FIG. 1 is an example cooling system utilizing a remediation reactor.

FIG. 1 illustrates selected portions of an example cooling system 10, such as an ultra-pure water cooling system. In this example, the cooling system 10 includes a heat exchanger 12 arranged within a cooling loop 14. The cooling loop 14 circulates a coolant, such as a water-based fluid, between the heat exchanger 12 and a device 16 that the coolant maintains at a desired temperature. The cooling loop 14 employs a remediation reactor 18 to maintain the coolant in a desired pure state. For example, the remediation reactor 18 removes organic and inorganic (ions) contaminants from the coolant to maintain a desired level of electrical resistivity and/or a desired coolant pH. The remediation reactor 18 also provides a biocide that kills microbes that might be present in the water. It is to be understood that the above described coolant system 10 is an example, and that other types of systems will also benefit from the remediation reactor 18.

Figure 2:
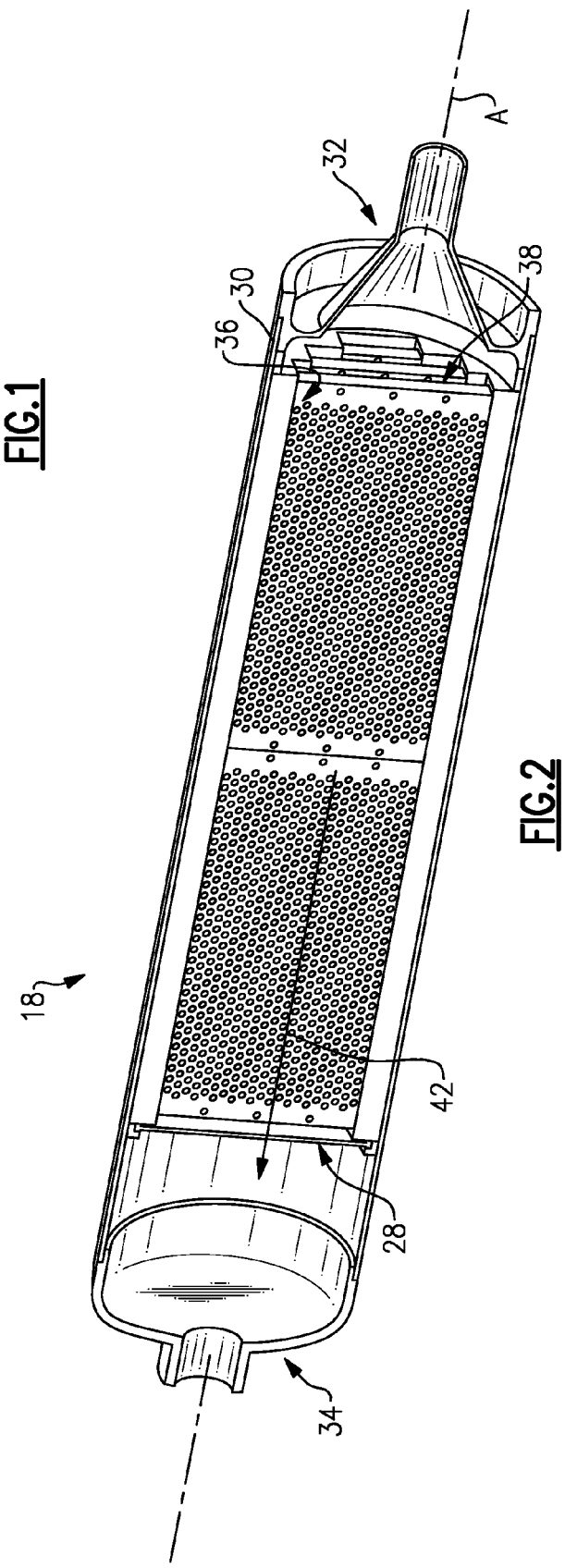
FIG. 2 is an example of the remediation reactor of FIG. 1.

FIG. 2 illustrates an example of the remediation reactor 18, which includes an outer container 30 providing a cavity 28 having an inlet 32 and an outlet 34. Although the container 30 is cylindrically shaped in this example, any number of different shapes may be used. The container 30 encloses at least one cartridge 36 within the cavity 28 for removing organic, inorganic and biological contaminants from the coolant. In the illustrated example, multiple cartridges 36 are used. However, it is to be understood that the number of cartridges 36 may be varied depending upon the contaminant removal needs of a particular system.

Figure 3:
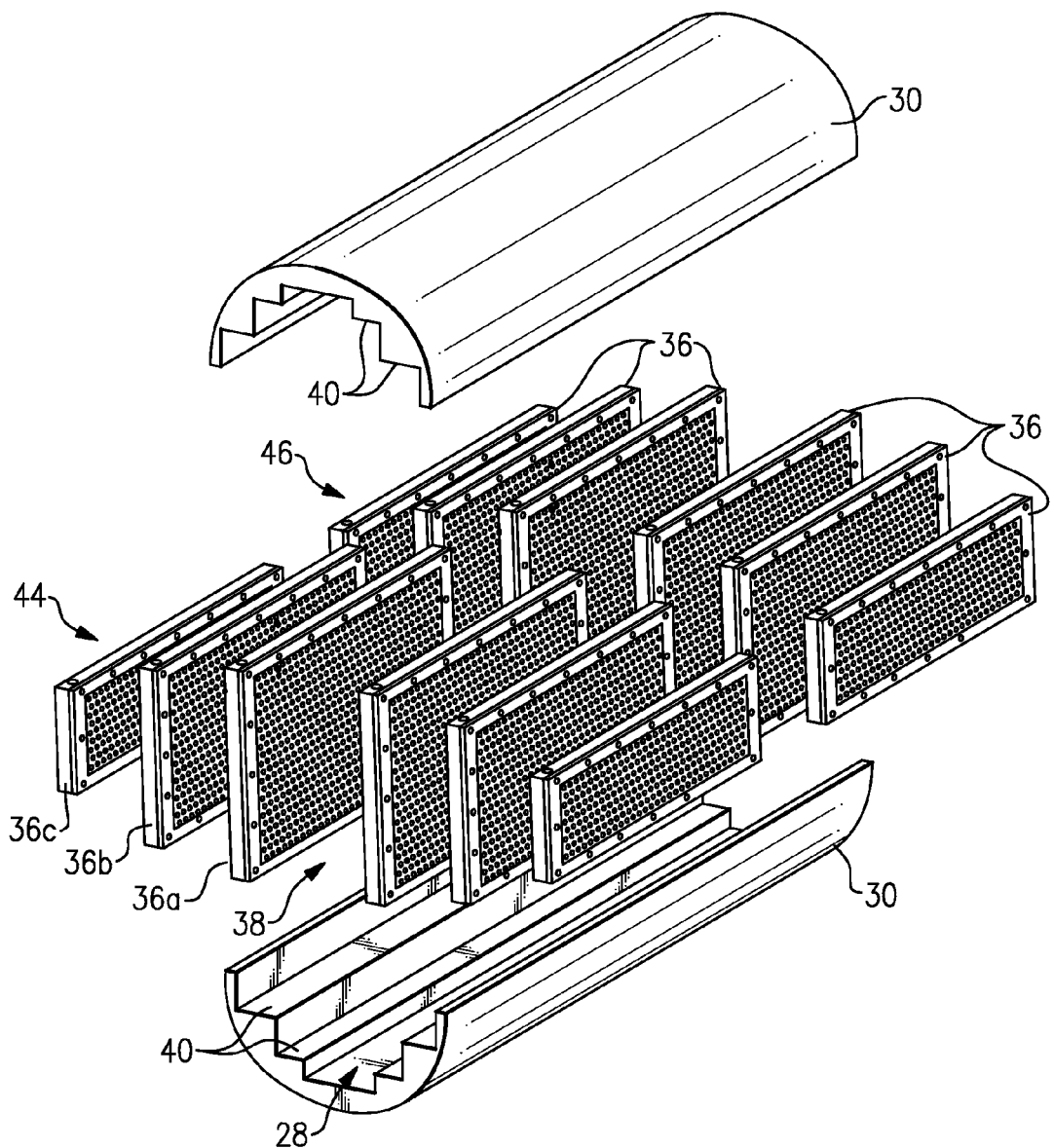
FIG. 3 is an exploded view of the example remediation reactor.

Referring also to the exploded view in FIG. 3, the cartridges 36 are spaced apart such that there are fluid passages 38 that extend between the cartridges 36. The amount of spacing between the cartridges 36 depends upon the desired contaminant removal performance, as will be described. The cartridges 36 vary in size. For example, a cartridge 36a located near the centerline A of the container 30 is larger than a cartridge 36b located farther from the centerline A. That is, the cartridge 36b includes less interfacial surface area exposed to the fluid passages 38 than the cartridge 36a. Similarly, the cartridge 36c, which is even farther from the centerline A, is smaller than the cartridge 36b.

The container 30 includes stepped grooves 40 for retaining and positioning the cartridges 36. In this example, the stepped grooves 40 position a first set of cartridges 44 parallel and end-to-end with a second set of cartridges 46. Alternatively, only one set of cartridges 36 could be used, or a greater number than two sets of cartridges may be used, depending upon the contamination removal needs of a particular system.

The stepped grooves 40 also position the cartridges 36 approximately parallel to a flow direction 42 (FIG. 2) through the remediation reactor 18. Thus, the fluid passages 38 extend linearly between the ends of the cartridges 36 and provide little or no resistance to coolant flow between the cartridges 36.

Figure 4:
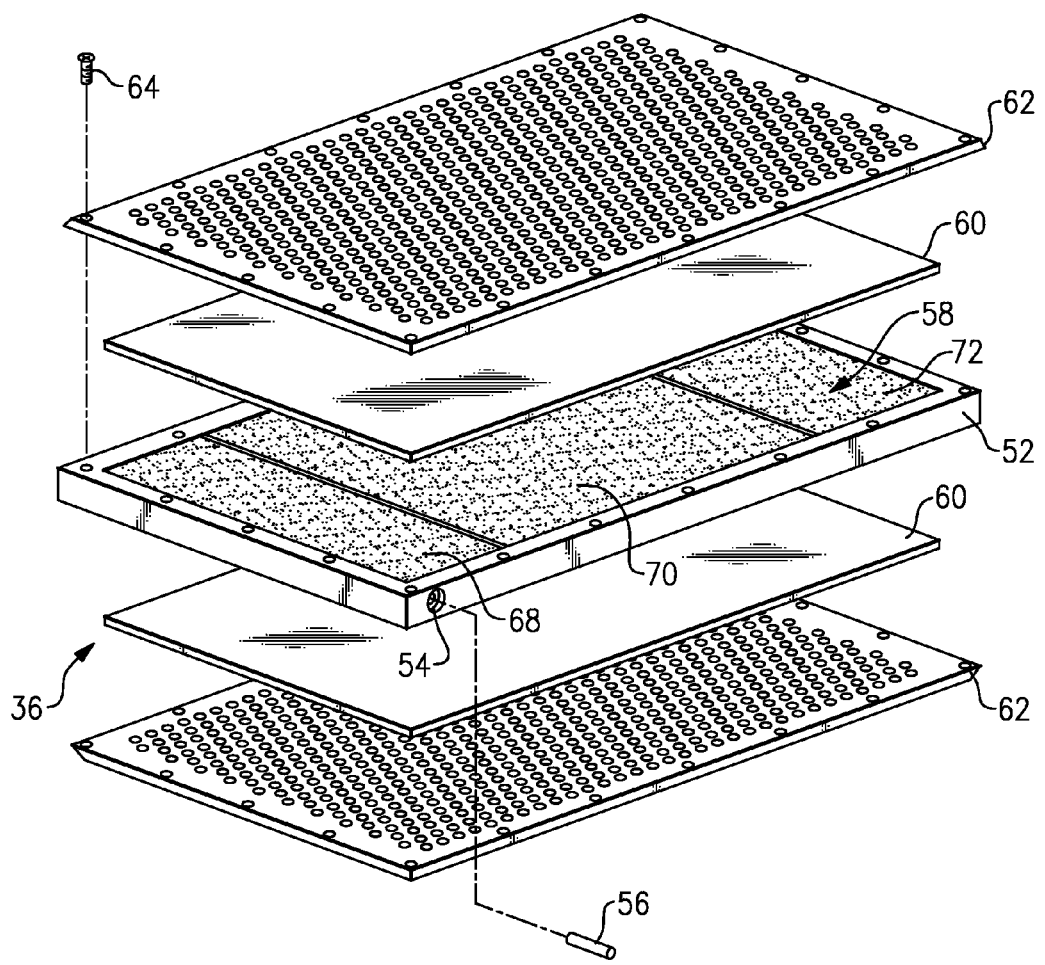
FIG. 4 is an exploded view of an example cartridge for use in the remediation reactor.

FIG. 4 illustrates an exploded view of an example cartridge 36. In this example, the cartridge 36 includes a frame 52. The frame 52 is a rectangular ring defining an interior open space 58. It is to be understood however, that the shape of the frame 52 may vary from the disclosed example, depending upon design factors, such as the size requirements of a particular system.

A porous screen 60 is attached on each planar side of the frame 52 between porous covers 62 that are secured to the frame 52. In this example, fasteners 64 extend through the porous covers 62 and into the frame 52 to secure the porous screens 60 between the porous covers 62 and the frame 52. The porous screens 60 and porous covers 62 permit access the open space 58 of the frame 52 to permit filling or removal of remediation media into the cartridge 36. Once assembled, the porous covers 62 and porous screen 60 permit water flow there through from the fluid passages 38 to the remediation media. The porosity of the porous screens 60 and the porous covers 62 limits the flow of coolant into and out of the cartridge 36.

Organic, inorganic and biological compound remediation media 68, 70, 72 are arranged within the cartridge 36 and segregated from one another. In the example, within a given cartridge 36, the organic remediation media 68 is arranged in closer proximity to the inlet 32, the biological remediation media 72 is arranged closest to the outlet 34. The inorganic remediation media 70 is arranged between the organic and biological remediation media 68, 72. In one example, the remediation media are arranged within individual mesh bags 74, 76, 78, as shown in FIG. 5. The lengths 80, 82, 84, widths and heights 86, 88, 90 may vary between the cartridges 36a, 36b, 36c depending on the desired contaminant removal rate, taking into consideration the iodination desired. The ratio of organic, inorganic and biological remediation media 68, 70, 72 is approximately 1:5:2 by volume, in one example, for each of the cartridges 36a, 36b. 36c. It should be understood that other ratios of media may be used depending upon the application.

In one example, the organic remediation media 68 is an activated carbon, such a media available by NORIT under the tradename DARCO Ro 0.8. An example inorganic remediation media 70 may be provided by a mixed bed ion exchange resin including an acidic cation resin and a basic anion resin in a 60/40 ratio, for example. One example inorganic remediation media 70 is available from Rohm and Hass under the tradename AMBERLITE MB 150. The biological remediation media 72 may be provided by an iodine resin configured to elute a suitable amount of iodine at a given pH level, for example, pH 7.0+/−1.0. A desirable amount of eluted iodine sufficient to act as a biocide is approximately 4 mg/L.

The segmented arrangement of organic, inorganic and biological remediation media 68, 70, 72 within a common cavity 28 enables the inorganic and organic constituents to be removed from the water while also permitting iodination resin to elute iodine to solution for microbiological control. Complete ionic removal from the water is limited. The remediation bed is essentially inefficient with regards to complete removal of all ionic constituents due to its geometry and open flow passages 38. This characteristic, along with a neutral pH level, which shifts all iodine species to $I_2$, permits iodine to remain in solution at levels above those needed for microbiological control. The flow rate and duration of run times through the cavity may be selected to allow for sufficient ionic and organic removal and iodination elution to the water. The effectiveness of contaminant removal and iodination is dependent upon the bed geometry and flow rate through the bed.

Although an example embodiment has been disclosed, a worker of ordinary skill in this art would recognize that certain modifications would come within the scope of the claims. For that reason, the following claims should be studied to determine their true scope and content.

What is claimed is:

1. A water-based remediation bed comprising:
   a container providing a fluid cavity, wherein the container is tubular and provides a linear flow direction; and
   organic, inorganic and biological remediation media arranged in the cavity and configured to permit a water-based liquid within the cavity to simultaneously flow through the media, wherein the organic, the inorganic, and the biological remediation media are respectively configured to remove organic, inorganic, and biological constituents, the organic, inorganic and biological remediation media arranged within the cavity along the linear flow direction, multiple cartridges arranged within the cavity and spaced apart from one another, wherein the cartridges are oriented along the linear flow path to provide unobstructed passages between the cartridges in the direction of the linear flow path, the biological remediation media is arranged closest to the outlet, and the biological remediation media is an iodine resin configured to elute molecular iodine.

2. The remediation bed according to claim 1, wherein each cartridge includes a frame having a porous screen removably secured to the frame, the organic, inorganic and biological remediation media disposed within the same frame.

3. The remediation bed according to claim 2, comprising a porous cover removably secured over the porous screen.

4. The remediation bed according to claim 1, wherein the organic, inorganic and biological remediation media are arranged within the same cartridge but separated from one another in segmented compartments.

5. The remediation bed according to claim 4, wherein the segmented compartments are arranged within mesh bags.

6. The remediation bed according to claim 1, wherein the organic, inorganic and biological remediation media are configured to chemically act concurrently with one another on the fluid within the cavity.

7. The remediation bed according to claim 1, wherein the container includes an inlet and an outlet, the organic remediation media is arranged closest to the inlet and the inorganic remediation media is arranged between the organic and biological remediation media.

8. The remediation bed according to claim 1, wherein the organic remediation media is an activated carbon.

9. The remediation bed according to claim 1, wherein the inorganic remediation media is an ion exchange resin.

10. The remediation bed according to claim 9, wherein the ion exchange resin includes an acidic cation resin and a basic anion resin in a ratio of about 60/40.

* * * * *